United States Patent
Okuyama (12) 
(10) Patent No.: US 6,184,295 B1
(45) Date of Patent: Feb. 6, 2001

(54) RUBBER COMPOSITION AND METHOD OF MANUFACTURING RUBBER COMPOSITION

(75) Inventor: Hideyuki Okuyama, Kobe (JP)

(73) Assignee: Sumitomo Rubber Industries, Ltd., Hyogo (JP)

( * ) Notice: Under 35 U.S.C. 154(b), the term of this patent shall be extended for 0 days.

(21) Appl. No.: 09/210,749

(22) Filed: Dec. 15, 1998

(30) Foreign Application Priority Data

Dec. 17, 1997 (JP) .................................................... 9-347491
Sep. 11, 1998 (JP) .................................................. 10-258211

(51) Int. Cl.$^7$ ............................ C08F 8/00; C08L 23/00; C08L 23/04
(52) U.S. Cl. ......................... 525/192; 525/194; 525/240; 525/241; 425/543; 425/383; 425/392; 264/230
(58) Field of Search ..................................... 525/192, 194, 525/240, 241; 425/543, 383, 392; 264/230

(56) References Cited

U.S. PATENT DOCUMENTS 5,856,399 * 1/1999 Itoh et al. ............................. 524/505

FOREIGN PATENT DOCUMENTS

| 0452089A1 | 10/1991 | (EP) . |
| 0651009A1 | 5/1995 | (EP) . |
| 0709413A1 | 5/1996 | (EP) . |
| 0733676A1 | 9/1996 | (EP) . |
| 2210047A | 6/1989 | (GB) . |

OTHER PUBLICATIONS

Abstract of European Patent Publication No. 07267395; dated Oct. 17, 1995.

* cited by examiner

*Primary Examiner*—Nathan M. Nutter
(74) *Attorney, Agent, or Firm*—Arent Fox Kintner Plotkin & Kahn (57) ABSTRACT

A rubber composition containing 20 parts by weight–200 parts by weight of hydrogenated styrene thermoplastic elastomer and poly-olefin for 100 parts by weight of rubber which is dynamically vulcanized with a resin vulcanizing agent to disperse the rubber in a mixture of the hydrogenated styrene thermoplastic elastomer and the poly-olefin.

15 Claims, 1 Drawing Sheet

RUBBER COMPOSITION AND METHOD OF MANUFACTURING RUBBER COMPOSITION

BACKGROUND OF THE INVENTION

1. Field of the Invention

The present invention relates to a rubber composition, a rubber roller comprising the rubber composition and a method of manufacturing the rubber composition. More particularly, the present invention relates to a modification of the rubber composition for use in paper-feeding rubber rollers of office appliances such as laser printers, electrostatic copying machines, facsimiles using ordinary paper and automatic deposit payment machines (ATM).

2. Description of the Related Art

The rubber composition for use in the paper-feeding rollers of office appliances such as laser printers, electrostatic copying machines, facsimiles and automatic deposit payment machines (ATM) is demanded to have high wear resistance and friction coefficient. In recent years, especially office appliances for personal use are in wide use and various kinds of paper are used therefor. Thus, the rubber roller is demanded to have high wear resistance and friction coefficient to feed various kinds of papers reliably. When the surface of the paper-feeding rubber roller is worn owing to repeated use, the friction coefficient thereof deteriorates, and hence slip occurs, which deteriorates the paper-feeding force greatly. Further, it is necessary that the rubber roller does not deteriorate in its performance applying a load at a high temperature. That is, the rubber roller is required to have a low permanent compression set.

Thus, in order to provide the rubber roller with a high friction coefficient and a high wear resistance, there have been proposed rubber rollers comprising a rubber composition formed of a sulfur-vulcanized mixture of a rubber material and thermoplastic elastomer. For example, it is known that EPDM rubber is used as the rubber material and urethane thermoplastic elastomer (TPU) is used as the thermoplastic elastomer. Further it is known that styrene butadiene rubber (SBR) is used as the rubber material and urethan thermoplastic elastomer (TPU) is used as the thermoplastic elastomer.

However, because the TPU is hard, the hardness of each of the rubber rollers composed of these rubber compositions cannot be lowered to an appropriate degree and hence the it is impossible to provide the rubber rollers with a preferable paper-feeding performance. In the rubber rollers, the rubber composition vulcanized with sulfur has blooming to a high extent, which causes the friction coefficient of the rubber roller to deteriorate.

Further, because matrix resin consists of urethane, it is necessary to reduce the amount of the matrix resin to allow the rubber roller to have a low hardness required for roller use. Thus, a problem occurs in kneadability. Further, there is another problem that because the friction coefficient of urethane is not so high, the rubber roller is prevented from having an appropriate friction coefficient.

Further, it is known that a rubber composition comprises thermoplastic crystalline poly-olefin and EPDM rubber vulcanized with phenol resin vulcanizing agent. However, when a rubber roller comprising the rubber composition is used as a paper-feeding roller, generation of blooming can be restrained. But the poly-olefin serving as forming matrix, namely, polyethylene and polypropylene are hard. Thus, it is impossible to reduce the hardness of the rubber roller sufficiently and hence the rubber roller is incapable of having a preferable paper-feeding performance.

As described above, efforts have been made to enhance the friction coefficient of the rubber composition or the rubber roller and reduce a permanent compression set by blending vulcanized rubber such as vulcanized EPDM rubber and thermoplastic resin or thermoplastic elastomer with each other. But a paper-feeding rubber roller which is so soft as to obtain a high friction coefficient for contact of paper and does not give rise to blooming and is superior in wear resistance has not been developed. It is described in the above patent publication that the permanent compression set can be improved. But as a result of examination, it was revealed that the paper-feeding performance of the rubber roller was not reliable when it was left with applying a load thereto at a high temperature, supposing that the rubber rollers are transported to a client.

SUMMARY OF THE INVENTION

The present invention has been made in view of the above-described object. It is an object of the present invention to inexpensively provide a rubber composition which can be molded into a paper-feeding rubber roller, which has a high friction coefficient, is superior in wear resistance, does not give rise to blooming, and has a low permanent compression set for use in office appliances, automatic deposit payment machines (ATM) and the like.

In order to achieve the object, the present inventors have energetically made researches and found that it is possible to improve a paper-feeding rubber roller for use in office appliances, automatic deposit payment machine (ATM), and the like in its wear resistance, friction coefficient, and permanent compression set and to provide a rubber composition molded into the rubber rollers at a low cost when the rubber of the paper-feeding rubber roller containing a specified amount of a mixture of hydrogenated styrene thermoplastic elastomer and poly-olefin used as forming matrix is dynamically vulcanized by resin vulcanization.

That is, the rubber composition according to the present invention contains 100 parts by weight of rubber, a mixture of hydrogenated styrene thermoplastic elastomer and poly-olefin in the range from 20 parts by weight to 200 parts by weight. The rubber is dynamically vulcanized with a resin vulcanizing agent to disperse it in the mixture of the hydrogenated styrene thermoplastic elastomer and the poly-olefin.

When the rubber composition is molded into a roller shape for using a rubber roller, the rubber roller can be used as a paper-feeding roller having preferable wear-resistance, friction coefficient, and permanent compression set and capable of preventing blooming, thus having superior paper-feeding performance.

As a method of producing the rubber composition, 100 parts by weight of rubber, a mixture of the hydrogenated styrene thermoplastic elastomer and the poly-olefin in the range from 20 parts by weight to 200 parts by weight, and the resin vulcanizing agent are heated while all of these materials are being kneaded to vulcanize the rubber dynamically. As a result, it is possible to obtain the rubber composition in which vulcanized fine particles of the vulcanized rubber are dispersed in the kneaded material. The method allows the rubber composition to be produced with ease and high productivity.

According to another present invention, 100 parts by weight of rubber, a mixture of the hydrogenated styrene thermoplastic elastomer, the poly-olefin, and a softener in the range from 20 to 300 parts by weight. The softener is added to the rubber in the range from 10 parts by weight to 200 parts by weight. The rubber is dynamically vulcanized with the resin vulcanizing agent to disperse it in the mixture of the hydrogenated styrene thermoplastic elastomer and the poly-olefin.

In the rubber composition to be thus produced, the dispersibility of the vulcanized rubber contained in the mixture of hydrogenated styrene thermoplastic elastomer and the poly-olefin is improved in the dynamic vulcanization. Thus, a rubber roller comprising the rubber composition molded into the shape of a roller has a higher wear resistance than a rubber roller comprising the rubber composition in above-mentioned rubber composition without the softener. Further, injection molding allows the fluidity of the rubber composition to be improved in molding it into the rubber roller, thus improving the moldability of injection molding.

As a method of manufacturing the rubber composition, 100 parts by weight of rubber, a mixture of the hydrogenated styrene thermoplastic elastomer, the poly-olefin, and a softener in the range from 20 parts by weight to 300 parts by weight. The softener is added to the rubber in the range from 10 parts by weight to 200 parts by weight. The rubber is dynamically vulcanized with the resin vulcanizing agent to disperse it as fine particles in the mixture of the hydrogenated styrene thermoplastic elastomer, the poly-olefin, and the softener. In the above method, it is preferable to carry out a method of preparing a kneaded material of the hydrogenated styrene thermoplastic elastomer, the poly-olefin, and the softener, and then dynamically vulcanizing the rubber while the above kneaded material, the rubber, and a resin vulcanizing agent are being kneaded to obtain a rubber composition in which fine particles of the vulcanized are dispersed in the kneaded material of the hydrogenated styrene thermoplastic elastomer, the poly-olefin, and the softener.

Using this method, the dispersibility of the rubber in the kneaded material during the dynamic vulcanization of the rubber is superior to that of the rubber obtained by dynamically vulcanizing the rubber in heating, kneaded the hydrogenated styrene thermoplastic elastomer, the poly-olefin, and the softener all together at the same time. That is, the method provides a rubber composition in which fine rubber particles having a slight size variation in their diameter are dispersed uniformly. Thus, a paper-feeding rubber roller comprising the rubber composition molded into the shape of a roller has a very high wear resistance. Further, injection molding allows the fluidity of the rubber composition to be improved in shaping it into the rubber roller, thus preventing the rubber composition from being molded defectively. That is, the method allows the rubber roller to be produced at a high productivity and to have high performance.

In the present invention, as rubber which can be dynamically vulcanized by the resin vulcanizing agent, it is possible to use one or two kinds selectively from EPDM rubber, butyl rubber, butadiene rubber, isoprene rubber, styrene butadiene rubber, chloroprene rubber, natural rubber, 1,2-polybutadiene, acrylonitrile-butadiene rubber, ethylene propylene rubber, acrylic rubber, and chlrosulfonated polyethylene. A rubber roller used in office appliances is demanded to have high ozone resistance and heat resistance. Thus, in order to obtain high ozone resistance and heat resistance for a rubber roller, it is preferable to use the EPDM rubber having high ozone resistance and heat resistance as a rubber which can be vulcanized by resin vulcanizing agent. In this case, it is favorable to use the EPDM rubber at 50 wt % or more for an entire rubber component. It is more favorable to use it at 80 wt % or more. It is most favorable to use only the EPDM rubber as the rubber component. The diene component of the EPDM rubber is not limited to a specific component, but ethylidene norbonene (ENB), dichloropentadiene (DCPD), and the like can be used.

The hydrogenated styrene thermoplastic elastomer which is used in the present invention is styrene thermoplastic elastomer having no double bonds owing to saturation by hydrogenated. The styrene thermoplastic elastomer has a lower hardness, a higher friction coefficient, and a lower permanent compression set than the above-described TPU conventionally used as matrix. Further, because the hydrogenated styrene thermoplastic elastomer does not have double bonds, it does not react with the resin vulcanizing agent and allows rubber to be dispersed as fine particles therein without inhibiting vulcanization thereof. Therefore, it is possible to form a rubber composition having a lower hardness and a lower permanent compression set owing to the influence of the rubber dispersed as fine particles in the hydrogenated styrene thermoplastic elastomer.

In particular, it is favorable to use the hydrogenated styrene thermoplastic elastomer having 80 or less in JIS-A hardness of which MFR (melt flow rate) is 5 g or more/10 minutes, or favorably 10 g or more/10 minutes at 230° C. under a load of 2.16 kg in accordance with JIS, K-6760. This is because if the JIS-A hardness is more than 80, a rubber roller has a high hardness and hence has a low friction coefficient and because if the MFR is less than 5 g/10 minutes, the hydrogenated styrene thermoplastic elastomer has a low processability. A series of Septon (trade name) manufactured by Kuraray Co., Ltd. can be favorably used as the hydrogenated styrene thermoplastic elastomer satisfying the above-described condition.

The friction coefficient of conventional thermoplastic crystalline poly-olefin or that of the TPU are 0.5–1.4, whereas that of the hydrogenated styrene thermoplastic elastomer is 1.6–1.9. The permanent compression set of the hydrogenated styrene thermoplastic elastomer is 30–80% of those of the thermoplastic crystalline poly-olefin or the TPU. The friction coefficients shown above were measured by the method shown in FIG. 1 which will be described later about rubber rollers composed of the thermoplastic crystalline poly-olefin, the TPU, and the hydrogenated styrene thermoplastic elastomer, respectively molded by injection molding.

The styrene thermoplastic elastomer which is the material of the hydrogenated styrene thermoplastic elastomer is a block copolymer consisting of a terminal block of polystyrene phase(S) and an intermediate block of rubber (elastomer). More specifically, the following styrene thermoplastic elastomers can be used: SBS whose intermediate block of the rubber (elastomer) consists of polybutadiene (B), SIS whose intermediate block of the rubber (elastomer) consists of polyisoprene (I), SES whose intermediate block of the rubber (elastomer) consists of polyethylene, SEPS whose intermediate block of the rubber (elastomer) consists of ethylene/propylene (E/P), SEBS whose intermediate block of the rubber (elastomer) consists of ethylen/butadiene (E/B) and the like. Of the above, it is preferable to use the SES, SEPS, and SEBS.

Poly-olefin commercially available can be used in the present invention. For example, it is possible to use one or two kinds selectively from polyethylene, polypropylene, ethylene ethyl acrylate resin, ethylene vinyl acetate resin, ethylene-methacrylate resin, and ionomer resin. In consideration of the procssability of the rubber composition, it is favorable to use the poly-olefin having a high MFR (melt flow rate) which is measured under JIS K-6760. That is, it is favorable to use the poly-olefin having MFR at 5.0 or more. It is more favorable to use the poly-olefin having MFR at 10 or more.

When the ionomer resin is used, it is possible to use substances neutralized with metal ion. The substances include copolymer of ethylene-acrylic acid, copolymer of ethylene-methacrylic acid, terpolymer of ethylene-acrylic acid-methacrylic acid. Metal ions for neutralizing the substances include alkali metal ion (sodium ion, potassium ion, lithium ion and the like), bivalent metal ion (zinc ion, calcium ion, magnesium ion, copper ion, manganese ion and the like), tervalent metal ion (alminium ion, neodymium ion and the like). Himiran 1702 (trade name) and Himiran 1555 manufactured by Mitui•Dupon Polychemical Co., Ltd. can be preferably used because the MFR (melt flow rate) thereof is more than 10.

It is favorable to use the hydrogenated styrene thermoplastic elastomer and the poly-olefin at 9:1–3:7 in weight ratio. It is more favorable to use the hydrogenated styrene thermoplastic elastomer and the poly-olefin at 9:1–5:5 in weight ratio. The hydrogenated styrene thermoplastic elastomer is superior to the poly-olefin because the hydrogenated styrene thermoplastic elastomer reduces the hardness of the rubber composition (improves frictional force used as roller) and improves its heat resistance and permanent compression set. The poly-olefin is superior to the hydrogenated styrene thermoplastic elastomer because the poly-olefin improves the wear resistance of the rubber composition, its processability (kneadability in dynamic vulcanization), and is not costly. In order to compensate the disadvantage of both substances each other and utilize the advantage thereof, the above weight ratio is set. If the hydrogenated styrene thermoplastic elastomer is used at a weight ratio higher than the above-described weight ratio, the wear resistance of the rubber composition and its kneadability deteriorate and a rubber roller costs high. If it is used at a weight ratio lower than the above-described weight ratio, the heat resistance of a rubber roller deteriorates (permanent compression set becomes great) and the friction coefficient thereof becomes low.

In the first aspect of the present invention in which the softener is not contained in the rubber composition, favorably, 20–200 parts by weight of a mixture of the hydrogenated styrene thermoplastic elastomer and the poly-olefin and more favorably 40–200 parts by weight of thereof is used for 100 parts by weight of rubber which can be dynamically vulcanized with the resin vulcanizing agent. This is because if the total amount of the hydrogenated styrene thermoplastic elastomer and the poly-olefin is less than 20 parts by weight, the amount of resin component is so small that it is difficult to perform kneading which is carried out during the dynamic vulcanization process to disperse the rubber in the mixture of the hydrogenated styrene thermoplastic elastomer and the poly-olefin and to cross-link the rubber. On the other hand, if the total amount of the hydrogenated styrene thermoplastic elastomer and the poly-olefin is more than 200 parts by weight, the amount of the dynamically vulcanized rubber contained in the mixture is so small that resulting rubber composition does not have a favorable effect in spite of the intention of modifying the rubber. That is, the rubber composition has a low wear resistance and thus has a large wear amount. Further, it has a low compression distortion (heat resistance) and thus the friction coefficient of a rubber roller comprising the rubber composition becomes lower during a long time use. In the case of oil-unextended rubber, 100 parts by weight of rubber means that the part by weight of the oil-unextended rubber is 100. In the case of oil-extended rubber, 100 parts by weight of rubber means that the only part by weight of rubber determined by subtracting the weight of oil from the weight of the oil-extended rubber is 100. In the case of a mixture of oil-extended rubber and oil-unextended rubber, 100 parts by weight of rubber means that the total of weight of the oil-unextended and the weight of rubber determined by subtracting the weight of oil from the weight of the oil-extended rubber is 100.

In the second aspect of the present invention, softener is contained in the rubber composition. As the softener, oil softener and plasticizer commercially available can be used. For example, it is possible to use oil softeners such as any kind of aroma, Teflon, and paraffin; and plasticizers such as any kind of phthalate, adipate, sebacate, phoshphate, polyether, and polyester. The oil softener means those commercially available and, if rubber which can be vulcanized dynamically with the resin vulcanizing agent is the old-extended, an oily component contained in the oil-extended.

10–200 parts by weight of softener is contained for 100 parts by weight of the rubber. This is because if the part by weight of the softener is less than 10, it is difficult to obtain the effect of adding the softener to the rubber. That is, it is difficult to obtain the effect of improving the dispersibility of the vulcanized rubber in the mixture of the hydrogenated styrene thermoplastic elastomer and the poly-olefin in the process of dynamically vulcanizing the rubber, On the other hand, if more than 200 parts by weight of softener is added to the rubber, the amount of the vulcanized rubber contained in the rubber composition is small. Thus, it is difficult to improve the strength (wear resistance) of the rubber composition, which means that a rubber roller comprising the rubber composition has great wear amount.

The total amount of the hydrogenated styrene thermoplastic elastomer, the poly-olefin, and the softener is set to 20–300 parts by weight for 100 parts by weight of the rubber is because of the reason described in the case of the first aspect of the present invention basically. It is favorable to set the total amount of the hydrogenated styrene thermoplastic elastomer, the poly-olefin, and the softener to 20–200 parts by weight and more favorable to 30–100 parts by weight for 100 parts by weight of the rubber. Similarly to the first aspect of the present invention, in the case of the oil-unextended rubber, 100 parts by weight of rubber means that the part by weight of the oil-unextended rubber is 100. In the case of oil-extended rubber, 100 parts by weight of rubber means that the part by weight of the rubber determined by subtracting the weight of oil from the weight of the oil-extended rubber is 100. When rubber is a mixture of the oil-extended rubber and the oil-unextended rubber, 100 parts by weight of rubber means that the total of the weight of the oil-unextended rubber and the weight of rubber determined by subtracting the weight of oil from the weight of the oil-extended rubber is 100.

The part by weight of the total of the hydrogenated styrene thermoplastic elastomer and the poly-olefin is set to favorably 0.3–5.0 and to more favorably, 0.5–3.5 for one part by weight of the softener. This is because if the part by weight of the total of the hydrogenated styrene thermoplastic elastomer and the poly-olefin is less than 0.3, the strength of the rubber composition is low and thus the wear resistance of a rubber roller is low. If the part by weight of the total of the hydrogenated styrene thermoplastic elastomer and the poly-olefin is more than 5.0, it is difficult to obtain the effect of improving the dispersibility of the vulcanized rubber by the addition of the softener, although it depends on dynamic vulcanizing processes or the addition amount of the contained softener for the rubber to the rubber composition. Consequently, the vulcanized rubber is prevented from being dispersed preferably.

As described previously, in the present invention, the resin vulcanizing agent is used for the reason described below: When rubber is vulcanized with sulfur, blooming is likely to occur. In particular, in order to improve the performance such as the strength and the like of the rubber roller comprising the rubber composition, it is necessary to use a large amount of sulfur and vulcanizing accelerator. As a result, the friction coefficient of the rubber roller is deteriorated by blooming. When rubber is vulcanized with peroxide, the vulcanizing agent is not dispersed unfavorably during kneading and greatly reacts with the peroxide. Consequently, the kneaded material is discharged and hence unprocessable.

As the resin vulcanizing agent which is used in the present invention, alkylphenol, formaldehyde resin, condensate of melamine and formaldehyde, condensate of triazine and formaldehyde, sulfonated-p-tertiary butylphenol resin, alkylphenol sulfide resin, and hexamethoxymethyl melamine resin can be used. Of the above, it is favorable to use alkyl phenol formaldehyde resin (reactive phenol resin) because it provides more favorable cross-linking than other resin vulcanizing agents. Thus, the strength (wear resistance) of the rubber composition can be improved and a rubber roller comprising the rubber composition has an improved heat resistance and a low permanent compression set. This is because of the change of cross-linking density. It is possible to add a catalyzer such as stannic chloride and the like with the resin vulcanizing agent.

Although the addition amount of the resin vulcanizing agent is varied according to the kind of vulcanizing agent, normally, favorably, 3–20 parts by weight thereof and more favorably, 10–15 parts by weight thereof is used for 100 parts by weight of rubber It is possible for the rubber composition to contain other thermoplastic resins if necessary in addition to the rubber, the hydrogenated styrene thermoplastic elastomer, the poly-olefin, and the softener. As other thermoplastic resins, it is possible to use ethylene ethyl acrylate resin, polyethylene resin, ethylene vinyl acetate resin, polypropylene resin, copolymer resin of ethylene and methacrylic acid and the like. The addition amount of these thermoplastic resins is set to favorably less than 30 parts by weight for 100 parts by weight of the total amount of the rubber, the hydrogenated styrene thermoplastic elastomer, and the poly-olefin (100 parts by weight of the total amount of the rubber, the hydrogenated styrene thermoplastic elastomer, the poly-olefin, and softener) and more favorably, less than 10 parts by weight. This is because if the rubber composition contains much organic components other than the rubber, the hydrogenated styrene thermoplastic elastomer, and the poly-olefin (rubber, hydrogenated styrene thermoplastic elastomer, the poly-olefin, and softener), the effect of the present invention cannot be displayed preferably.

It is possible for the rubber composition to contain aging preventive agent and filler and the like if necessary. As the filler, it is possible to use particles of silica, carbon black, cray, talc, calcium carbonate, dibasic lead phosphite (DLP), basic magnesium carbonate, and alumina and the like. It is preferable to add the filler at less than 15 parts by weight for 100 parts by weight of rubber. The addition of the filler is effective for improving the tensile strength of the rubber composition and tearing strength thereof. On the other hand, if the rubber composition contains too much filler, the flexibility of the rubber composition deteriorates and thus the friction coefficient of a rubber roller comprising the rubber composition deteriorates.

In the present invention, excluding non-polymer component such as process oil, aging preventive agent, filler and the like, polymer component (rubber+hydrogenated styrene thermoplastic elastomer+poly-olefin+resin vulcanizing agent+other resin additive) is favorably 46 wt %–95 wt % and more favorably 59 wt %–95 wt % for the entire rubber composition.

The polymer component is set to more than 46 wt % to improve the strength of the rubber composition (secure wear resistance) and to less than 95 wt % to secure favorable kneadability and moldability of the rubber composition.

According to the present invention, the rubber which can be dynamically vulcanized, the hydrogenated styrene thermoplastic elastomer, the poly-olefin, the resin vulcanizing agent (rubber which can be dynamically vulcanized, hydrogenated styrene thermoplastic elastomer, poly-olefin, softener and the resin vulcanizing agent), and required various additives are heated while they are being kneaded to dynamically vulcanize the rubber. As a result, the kneaded rubber composition in which fine particles of the vulcanized rubber are dispersed can be obtained. The kneaded rubber composition is molded into a paper-feeding rubber roller by extrusion molding or injection molding.

In a mixture containing the softener, the kneadability thereof can be improved in the dynamic vulcanizing process of a rubber heated while they are being kneaded. The kneaded rubber composition in which fine particles of the vulcanized rubber are uniformly dispersed is obtained. Accordingly, the melting viscosity of the kneaded rubber composition becomes low, which allows a rubber roller obtained by molding it by injection molding to have favorable fluidity and prevents the rubber composition from defectively molded. Further, the vulcanized rubber of the rubber composition containing the softener is dispersed more finely and uniformly than the vulcanized rubber of the rubber composition not containing t he softener. Thus, t he rubber roller containing the softener has a higher wear resistance than the rubber composition not containing the softener. When the melting viscosity of the kneaded rubber composition is less than 0.85 kPa·sec at 200° C., it is possible to form a rubber roller that can be put into practical use without problem. When the melting viscosity of the kneaded rubber composition is less than 0.7 kPa·sec at 200° C., it is possible to form a rubber roller without defective molding and with high productivity.

According to a method of the present invention, the softener, the hydrogenated styrene thermoplastic elastomer, and the poly-olefin are kneaded in advance to prepare a kneaded material. Then, the kneaded material, the rubber, the resin vulcanizing agent, and other additives are heated while they are being kneaded to dynamically vulcanize the rubber. In this method, the kneadability of the rubber composition can be improved to a higher extent in the dynamic vulcanization process. Thus, it is possible to obtain the rubber composition in which fine particles of the vulcanized rubber having substantially an equal diameter are uniformly dispersed. Accordingly, the melting viscosity of the kneaded rubber composition becomes much lower and hence it is possible to mold the rubber composition into a rubber roller by injection molding without defective molding occurring. The diameters of fine particles of the vulcanized rubber of the rubber composition obtained by this method have smaller variations than those of fine particles of the vulcanized rubber of the rubber composition obtained by molding the kneaded material of the softener, the hydrogenated styrene thermoplastic elastomer, the poly-olefin, and the rubber all together at the same time. Thus, the rubber roller obtained by this method has a higher wear resistance than the rubber roller obtained by the method of molding all the components all together.

Describing the above method more specifically, the hydrogenated styrene thermoplastic elastomer is swelled in the softener, and then, mixed with pellet of the poly-olefin and the mixture is kneaded, and then, extruded to form pellet. Thereafter, the pellet, the rubber, the resin vulcanizing agent, and other additives are introduced into a rubber-kneading apparatus such as a biaxial extruder, an open roll, a Banbury mixer, a kneader. Then, the mixture is kneaded for 1–20 minutes while it is being heated at 160° C.–200° C. to dynamically vulcanize the rubber. Then, the kneaded material is extruded from the rubber-kneading apparatus. The pellet of the extruded rubber composition is injected into an injection molding machine to mold it into a tube shape. After the surface of the molded material is polished, it is cut to pieces having a predetermined size to form the rubber roller.

In the present invention, it is necessary that at least the surface (surface contacting paper) of a paper-feeding rubber roller comprises the rubber composition. More specifically, the paper-feeding roller comprises a rubber roller tube-shaped by molding and the paper-feeding roller is installed on the core material made of metal or resin. In this case, it is necessary that the surface (surface contacting paper) of the paper-feeding rubber roller comprises the rubber composition. It is possible to provide the gap between the core material and the rubber roller with an adhesive layer and the like. The thickness of the adhesive layer is favorably 1 mm–20 mm and more favorably, 3 mm–20 mm. This is because at a thickness less than 1 mm, the rubber roller has a low elasticity and the paper-feeding performance deteriorates in a short period of time.

It is preferable to polish the surface of the paper-feeding rubber roller of the present invention. Firstly the hydrogenated styrene thermoplastic elastomer is polished because of easier workability for polishing than that of the rubber, irregularities (convex parts of rubber) are formed effectively on the surface of the roller according to the polished extent of the hydrogenated styrene thermoplastic elastomer and the rubber. Thus, the surface of the rubber roller contacts the surface of paper in such a manner that the surface of the rubber roller has a great gripping force for the paper. That is, the polished surface of the rubber roller has a high friction coefficient.

DESCRIPTION OF THE PREFERRED EMBODIMENTS

The embodiments of the present invention will be described below.

Embodiment 1

In experiments 1–11 and comparison examples 1–6, hydrogenated styrene thermoplastic elastomer (B) and poly-olefin (C) were used at the proportion shown in tables 1 and 2 for 100 parts by weight of EPDM rubber (A) of ENB (in comparison example 1, poly-olefin was not used). Further, additives which will be described later were added to the mixture. The EPDM rubber was dynamically vulcanized by heating all the materials while the mixture was being kneaded to prepare a rubber composition in which the vulcanized EPDM rubber was dispersed.

The EPDM rubber (A) of ENB used in the experiments 1–11 and comparison examples 1–6 was oil-extended EPDM rubber: Esprene E670F manufactured by Sumitomo Kagaku Kogyo Co., Ltd and contained the same amount of paraffin oil and the EPDM rubber polymer. That is, 100 parts by weight of the EPDM rubber (A) in the experiments 1–11 and the comparison examples 1–6 shown in the table means that 100 parts by weight of the EPDM rubber polymer and 100 parts by weight of the paraffin oil were contained.

The hydrogenated styrene thermoplastic elastomer (B) and the poly-olefin (C) were used at the proportion shown in table 2 for 100 parts by weight of a compounded rubber (A') consisting of 50 parts by weight of the EPDM rubber of ENB and 50 parts by weight of butyl rubber (IIR) in the experiment 12; for 100 parts by weight of a compounded rubber (A') consisting of 50 parts by weight of the EPDM rubber of ENB and 50 parts by weight of butadiene rubber (BR) in the experiment 13; and for 100 parts by weight of a compounded rubber (A') consisting of 50 parts by weight of the EPDM rubber of ENB and 20 parts by weight of butadiene rubber (BR) in the experiment 14. Then, additives which will be described later are added to the mixture and all the materials were heated while they were being kneaded to dynamically vulcanize the EPDM rubber. As a result, kneaded rubber compositions in which the EPDM rubber had been dispersed were prepared. The kneaded rubber compositions were molded into rubber rollers of a roller shape.

The EPDM rubber of ENB used in the experiments 12–14 was EPDM rubber: Esprene E670F, oil-extended EPDM rubber manufactured by Sumitomo Kagaku Co., Ltd and contained the same amount of paraffin oil and the EPDM rubber polymer. That is, 50 (80) parts by weight of the EPDM rubber in the experiments 12–14 shown in the table means that 50 (80) parts by weight of the EPDM rubber polymer and 50 (80) parts by weight of the paraffin oil were contained.

The hydrogenated styrene thermoplastic elastomer (SEPS) used in the each experiment and the each comparison example was a mixture of SEPS Septon 2002 and SEPS Septon 2063 (both manufactured by Kuraray Co., Ltd.) mixed at a weight ratio of 1:1. In the experiment 8, only SEPS Septon 2063 was used and in the experiment 9, only SEPS Septon 2023 was used.

The poly-olefin was used in the experiments 1–7, 10, 12–14. Ionomer resin (Himiran 1702 manufactured by Mitsui Dupon Polychemical Co., Ltd.) was used in the comparison examples 2–5. Ethylene ethyl acrylate resin (manufactured by Nippon Unika Co., Ltd.: DPDJ-9161) was used in the experiment 8. Polypropylene resin (NovatekPP manufactured by Nippon Polychem Co., Ltd.) was used in the experiment 9.

In the experiments 1–17 and the comparison examples 1–4, 6 in which the resin vulcanizing agent was used, as additives, 12 parts by weight of phenol resin vulcanizing agent (manufactured by Taoka Kagaku Kogyo Co., Ltd.: Tackirol 250-III) and 5 parts by weight of zinc oxide (manufactured by Mitusi Kinzoku Kogyo Co., Ltd.: Chinese white No. 1) were used.

In the case (comparison example 5) where rubber was vulcanized with sulfur, as additives, one part by weight of powder sulfur (manufactured by Tsurumi Kagaku Kogyo Co., Ltd.) and stearic acid (manufactured by Nippon Yushi Co., Ltd.) were used. As vulcanizing accelerators, one part by weight of Nokseller TET (manufactured by Ouchi Shinko Kagaku Kogyo Co., Ltd.) and two parts by weight of Nokseller Bz were used.

Preparation of kneaded rubber compositions and molding thereof manufacturing rubber rollers were performed as follows: That is, using a biaxial extruder HTM38 (Aipek Co., Ltd.) having a mouthpiece installed on an extruding opening to extrude the kneaded rubber composition in the shape of a tube, all materials were introduced thereinto. Then, the mixture was extruded in the shape of a tube while it was being kneaded at 160° C.–200° C. Then, the molded material was divided into pieces having a predetermined size and then cut for polishing the surface of each divided pieces was polished and cut for size adjustment. In this manner, cylindrical rubber rollers each having an outer diameter of 20 mm, an inner diameter of 9 mm, and a width of 10 mm were manufactured.

The following characteristics of the rubber rollers of each experiment and comparison example thus prepared was measured.

(Permanent compression set)

The permanent compression set of each rubber roller was measured in accordance with JIS-K 6301.

(Wear resistance, friction coefficient, wear amount)

Figure 1:
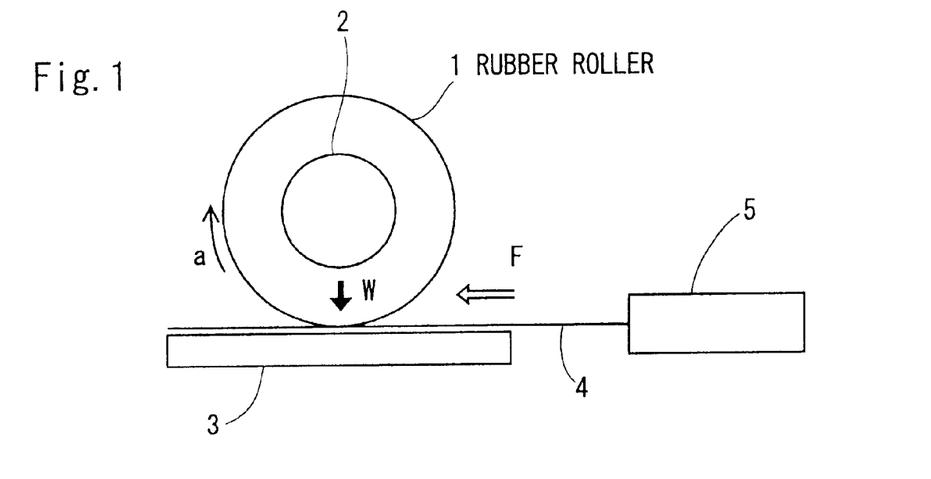
FIG. 1 is a schematic view showing a measuring device for measuring the friction coefficient of a rubber roller.

The heat resistance was evaluated by examining whether paper was jammed, using a method described below. That is, supposing that each rubber roller will be transported by ship, each rubber roller installed on a resin core material was left in contact with air at 50° C. for 60 days, with a load of 250 g kept to be applied thereto. Then, each rubber roller was installed on a copying machine to conduct a paper-feeding test. That is, by using the copying machine 15,000 sheets of paper of size A4 (PPC paper: manufactured by Fuji Xerox Office Supply Co., Ltd.) were continuously fed to the copying machine for 7.5 hours at 22° C. and a humidity of 55%. A rubber roller which allowed all sheets of paper to be fed successfully was determined as ◯. A rubber roller which caused several sheets of paper to be fed unsuccessfully was determined as X. The wear amount (mg) was determined by measuring the weight of each rubber roller before and after the paper-feeding test was conducted. In the paper-feeding test, the friction coefficient of each rubber roller was measured by a method shown in FIG. 1 as described below. That is, a load (W) (W=250 g) was applied to a shaft 2 of a rubber roller 1 as shown by a black arrow of FIG. 1 to press the rubber roller 1 against a plate 3, with PPC paper 4 of size A4 connected with a load cell 5 sandwiched between the rubber roller 1 and the plate 3. Then, at 22° C. and a humidity of 55%, the rubber roller 1 was rotated at a circumferential speed of 300 mm/second in a direction shown by an arrow (a) written in solid line of FIG. 1. A force F(g) generated in a direction shown by a white arrow of FIG. 1 was measured before and after 15,000 sheets of paper were passed between the rubber roller 1 and the plate 3. From the measured value F(g) and the lead W (250 g), the friction coefficient (ν) of each rubber roller was determined by using the following equation. The friction coefficient (ν) was measured before and after 15,000 sheets of paper were passed between the rubber roller 1 and the plate 3.

$$\nu = F(g)/W(g)$$

(Material Cost)

In the tables 1 and 2, each material cost of the rubber roller of each experiment and comparison example are shown with respect to the material cost of the rubber roller of the comparison example 1 which was set to 100.

Results are shown in the tables 1 and 2.

TABLE 1

| | EPDM Rubber (A) | Styrene TPE (B) | Poly-Olefin (C) | B:C | $\frac{B+C}{A}$ | MFR | Hardness | Vulcanizing Agent | Permanent Compression Set | Friction Coefficient | Wear Amount (mg) | Heat Resistance | Material Cost |
|---|---|---|---|---|---|---|---|---|---|---|---|---|---|
| Comparison Example 1 | 100 | 100 | — | 10:0 | 1.0 | 30 | JISA56 | Resin | 25 | 2.3(2.1) | 16 | ◯ | 100 |
| Experiment 1 | 100 | 90 | Ionomer 10 | 9:1 | 1.0 | 29 | JISA60 | Resin | 25 | 2.3(2.1) | 14 | ◯ | 95 |
| Experiment 2 | 100 | 50 | Ionomer 50 | 5:5 | 1.0 | 22 | JISA75 | Resin | 27 | 2.2(2.1) | 11 | ◯ | 85 |
| Experiment 3 | 100 | 30 | Ionomer 70 | 3:7 | 1.0 | 18 | JISA85 | Resin | 37 | 2.1(2.0) | 10 | ◯ | 75 |
| Comparison Example 2 | 100 | — | Ionomer 100 | 0:10 | 1.0 | 14 | JISA55 | Resin | 60 | 1.9(—) | — | × | 65 |
| Comparison Example 3 | 100 | 5 | Ionomer 5 | 5:5 | 0.1 | 22 | JISA75 | Resin | — | — | — | — | 70 |
| Experiment 4 | 100 | 10 | Ionomer 10 | 5:5 | 0.2 | 22 | JISA75 | Resin | 17 | 2.4(2.2) | 9 | ◯ | 70 |
| Experiment 5 | 100 | 20 | Ionomer 20 | 5:5 | 0.4 | 22 | JISA75 | Resin | 18 | 2.2(2.1) | 10 | ◯ | 75 |
| Experiment 6 | 100 | 80 | Ionomer 80 | 5:5 | 1.6 | 22 | JISA75 | Resin | 28 | 2.1(2.0) | 10 | ◯ | 85 |
| Experiment 7 | 100 | 100 | Ionomer 100 | 5:5 | 2.0 | 22 | JISA75 | Resin | 30 | 2.1(2.0) | 11 | ◯ | 90 |
| Comparison Example 4 | 100 | 120 | Ionomer 120 | 5:5 | 2.4 | 22 | JISA75 | Resin | 41 | 2.0(—) | — | × | 90 |
| Experiment 8 | 100 | 50 | EEA 50 | 5:5 | 1.0 | 25 | JISA70 | Resin | 33 | 2.1(2.0) | 15 | ◯ | 85 |
| Experiment 9 | 100 | 50 | PP 50 | 5:5 | 1.0 | 29 | JISA78 | Resin | 36 | 2.1(2.0) | 16 | ◯ | 75 |
| Experiment 10 | 100 | 50 | Ionomer 50 | 5:5 | 1.0 | 10 | JISA66 | Resin | 25 | 2.1(2.0) | 10 | ◯ | 85 |
| Experiment 11 | 100 | 50 | Ionomer 50 | 5:5 | 1.0 | 5 | JISA74 | Resin | 24 | 2.3(2.0) | 11 | ◯ | 85 |

TABLE 1-continued

|  | EPDM Rubber (A) | Styrene TPE (B) | Poly-Olefin (C) | B:C | $\frac{B+C}{A}$ | MFR | Hardness | Vulcanizing Agent | Permanent Compression Set | Friction Coefficient | Wear Amount (mg) | Heat Resistance | Material Cost |
|---|---|---|---|---|---|---|---|---|---|---|---|---|---|
| Comparison Example 5 | 100 | 50 | Ionomer 50 | 5:5 | 1.0 | 22 | JISA75 | Sulfur | 35 | 1.0(—) | — |  | 80 |
| Comparison Example 6 | 100 | 40 | — | 10:0 | 1.0 | 30 | JISA56 | Resin | — | — | — | — | 85 |

TABLE 2

|  | Compounded Rubber (A') | Styrene TPE (B) | Poly-Olefin (C) | B:C | $\frac{B+C}{A'}$ | MFR | Hardness | Vulcanizing Agent | Permanent Compression Set | Friction Coefficient | Wear Amount (mg) | Heat Resistance | Material Cost |
|---|---|---|---|---|---|---|---|---|---|---|---|---|---|
| Experiment 12 | EPDM 50 IIR 50 | 50 | Ionomer 50 | 5:5 | 1.0 | 22 | JISA75 | Resin | 37 | 2.2(2.1) | 14 | ○ | 80 |
| Experiment 13 | EPDM 50 BR 50 | 50 | Ionomer 50 | 5:5 | 1.0 | 22 | JISA75 | Resin | 32 | 2.2(2.1) | 12 | ○ | 75 |
| Experiment 14 | EPDM 80 BR 20 | 50 | Ionomer 50 | 5:5 | 1.0 | 22 | JISA75 | Resin | 29 | 2.2(2.1) | 11 | ○ | 80 |

In the tables 1 and 2, (B+C)/A is the ratio of the part by weight of the total of the hydrogenated styrene thermoplastic elastomer (B) and the poly-olefin (C) to the part by weight (part by weight of rubber polymer) of the rubber (A).

The MFR shown in the tables 1 and 2 is the MFR of the mixture of the hydrogenated styrene thermoplastic elastomer (B) and the poly-olefin (C).

The hardness shown in the tables 1 and 2 is the hardness of the mixture of the hydrogenated styrene thermoplastic elastomer (B) and the poly-olefin (C). The hardness of the rubber roller of the comparison example 2 was measured in accordance with JIS D. The hardness of the rubber roller of each of the experiments and other comparison examples were measured in accordance with JIS A.

The friction coefficients shown in front of parenthesized ones in the tables 1 and 2 are initial values measured before 15,000 sheets of paper were fed by each rubber roller left for 60 days. The friction coefficients parenthesized in the tables 1 and 2 were values measured after 15,000 sheets of paper were fed.

In the comparison examples 2, 4, and 5, the paper-feeding test was suspended because paper-feeding operation was unsuccessful before 15,000 sheets of paper were fed. Thus, it was impossible to measure the friction coefficient and wear amount of each roller of the comparison examples 2, 4, and 5 and evaluate the heat resistances thereof.

In the comparison examples 3 and 6, kneading could not be accomplished and thus rubber rollers could not be prepared.

As indicated in the tables 1 and 2, the rubber rollers of all the experiments were preferable in their permanent compression sets, friction coefficients, wear amounts, heat resistances, and material costs.

The rubber roller of the experiment 4 had favorable performance. The rubber composition of the rubber roller comprised oil-extended EPDM rubber which could be cross-linked with resin vulcanizing agent. 20 parts by weight of a mixture of the hydrogenated styrene thermoplastic elastomer (B) and the poly-olefin (C) were added to 100 parts by weight of the EPDM rubber (A) (100 parts by weight of EPDM rubber polymer and 100 parts by weight of paraffin oil). The weight ratio between the hydrogenated styrene thermoplastic elastomer (B) and the poly-olefin (C) was set to 5:5.

In the experiment 8 using ethylene ethyl acrylate resin (EEA) used as the poly-olefin and the experiment 9 using polypropylene resin (PP) used as the poly-olefin, the addition amount of the hydrogenated styrene thermoplastic elastomer (B) used in the experiment 8 was equal to that of the poly-olefin (C) used in the experiment 9. The weight ratio set therebetween set in the experiment 8 was also equal to that set in the experiment 9. In the experiment 2, ionomer resin was used. Thus, the friction coefficient, the wear amount, and the permanent compression set of each of the experiments 8 and 9 were a little inferior to those of the experiment 2. But the rubber rollers of the experiments 8 and 9 having the values could be put into practical use without problem.

In the experiment 12, a mixture of the oil-extended EPDM rubber and butyl rubber (IIR) were used. In the experiments 13 and 14, a mixture of the oil-extended EPDM rubber and butadiene rubber (BR) were used. In the experiment 2, only the EPDM rubber was used. The experiments 12–14 and the experiment 2 were the same in the other formulations thereof. Although the wear amount and the permanent compression set of the experiments 12–14 were a little inferior to those of the experiment 2, the rubber rollers of the experiments 12–14 were preferable in practical use.

The material costs of the rubber rollers of all the experiments were much lower than that of the rubber roller of comparison example 1 formed not of the poly-olefin (C) but of a large amount of the hydrogenated styrene thermoplastic elastomer (B) added to the EPDM rubber (A) (100 parts by weight of EPDM rubber (A) and 100 parts by weight of hydrogenated styrene thermoplastic elastomer (B) were used).

The rubber roller of the comparison example 1 had favorable performance because a large amount of the hydrogenated styrene thermoplastic elastomer (B) was used for the EPDM rubber (A). But the material cost of the rubber roller of the comparison example 1 was high. On the other hand, in the comparison example 6, the addition amount of the hydrogenated styrene thermoplastic elastomer (B) was reduced for cost reduction. That is, 40 parts by weight of the hydrogenated styrene thermoplastic elastomer (B) was added to 100 parts by weight of the EPDM rubber (A). Thus, kneading could not be accomplished and thus a rubber roller could not be formed in the comparison example 6.

The rubber roller of the comparison example 2 was formed not of the hydrogenated styrene thermoplastic elastomer (B) but of the poly-olefin (C) added in a large amount to the EPDM rubber (A) (100 parts by weight of EPDM rubber (A) and 100 parts by weight of poly-olefin (C) were used). Thus, the rubber roller of the comparison example 2 was very poor in its permanent compression set and heat resistance. Thus, the rubber roller was deformed in a large amount after it was left at 50° C. for 60 days by applying a load thereto and further, the initial friction coefficient thereof was small. Further, the paper-feeding operation was unsuccessful before the predetermined number of sheets (15,000) was fed. Thus, the paper-feeding test was suspended.

Although both the hydrogenated styrene thermoplastic elastomer (B) and the poly-olefin (C) were added to the EPDM rubber (A) in the comparison example 3, the value of (B+C)/A was 0.1. Thus, kneading could not be accomplished. In the comparison example 4, the value of (B+C)/A was 2.4. Thus, the amount of rubber was so small that the In experiments 20 and 24, the hydrogenated styrene thermoplastic elastomer (S), the poly-olefin (O), and the softener (N) were added in the proportions shown in table 3 to 100 parts by weight of oil-extended EPDM rubber of ENB. In addition, additives which will be described below were used and kneading and dynamic vulcanization were carried out to prepare a kneaded rubber composition.

In experiment 21, the hydrogenated styrene thermoplastic elastomer (S), the poly-olefin (O), and the softener (N) were added in the proportions shown in table 3 to a mixture of 50 parts by weight of the oil-unextended EPDM rubber of ENB and 50 parts by weight of butyl rubber (IIR). In addition, additives which will be described below were used and kneading and dynamic vulcanization were carried out to prepare a kneaded rubber composition.

TABLE 3

| | Rubber | Styrene TPE (S) | Poly-Olefin (O) | S + O | Softener (N) | S + O + N | $\frac{S+O}{N}$ | Friction Coefficient (after feeding of 20000 sheets) | Friction Amount (ng) | Melting Viscosity (kPa · sec) 200° C. | Injection Moldability |
|---|---|---|---|---|---|---|---|---|---|---|---|
| Experiment 15 | 100 | 30 | PP 30 | 60 | 40 | 100 | 1.5 | 2.3(2.1) | 12 | 0.75 | ○ |
| Experiment 16 | 100 | 30 | PP 30 | 60 | 100 | 160 | 0.6 | 2.1(2.1) | 15 | 0.68 | ◎ |
| Experiment 17 | 100 | 30 | PP 30 | 60 | 200 | 260 | 0.3 | 2.2(2.1) | 18 | 0.64 | ◎ |
| Experiment 18 | 100 | 5 | PP 5 | 10 | 10 | 20 | 1.0 | 2.5(2.4) | 9 | 0.78 | ○ |
| Experiment 19 | 100 | 100 | PP 30 | 130 | 170 | 300 | 0.76 | 2.2(2.0) | 20 | 0.61 | ◎ |
| Experiment 20 | 100 | 30 | PP 30 | 60 | ※(100) 40 | 100 | 1.5 | 2.4(2.2) | 14 | 0.67 | ◎ |
| Experiment 21 | 100 | 30 | PP 30 | 60 | 40 | 100 | 1.5 | 2.2(2.1) | 15 | 0.73 | ○ |
| Experiment 22 | 100 | 100 | PP 5 | 105 | 100 | 205 | 1.05 | 2.3(2.0) | 18 | 0.66 | ◎ |
| Experiment 23 | 100 | 30 | EEA 30 | 60 | 40 | 100 | 1.5 | 2.1(2.0) | 14 | 0.73 | ○ |
| Experiment 24 | 100 | 30 | PP 30 | 60 | ※(100) | 220 | 0.6 | 2.2(2.0) | 17 | 0.81 | ○ |
| Experiment 25 | 100 | 30 | PP 30 | 60 | 100 | 220 | 0.6 | 2.2(2.0) | 18 | 0.80 | ○ |

※ (100) means 100 parts by weight of the paraffin oil as softener.

rubber roller was poor in its permanent compression set and heat resistance. Consequently, the rubber roller was deformed in a great amount after it was left at 50° C. for 60 days by applying a load thereto and further, the initial friction coefficient thereof was small. Further, the paper-feeding operation was unsuccessful before the predetermined number of sheets (15,000) was fed. Thus, the paper-feeding test was suspended. In the comparison example 5, rubber was vulcanized with sulfur. The sulfur was deposited on the surface of the rubber roller and further, the initial friction coefficient thereof was small. Further, the paper-feeding operation was unsuccessful before the predetermined number of sheets (15,000) were fed. Thus, the paper-feeding test was suspended.

Embodiment 2

In order to confirm preferable addition amount of softener and a preferable addition mode thereof, an experiment described below was conducted. In experiments 15–19, 22, and 25, hydrogenated styrene thermoplastic elastomer (S), poly-olefin (O), and softener (N) were added in the proportions shown in table 3 to 100 parts by weight of oil-unextended EPDM rubber of ENB. In addition, additives which will be described below were used and kneading and dynamic vulcanization were carried out to prepare a kneaded rubber composition.

In the table 3, the symbol (S) denotes the part by weight of the hydrogenated styrene thermoplastic elastomer. The symbol (O) denotes the part by weight of the poly-olefin. The value of S+O is the total of the part by weight of the hydrogenated styrene thermoplastic elastomer and the part by weight of the poly-olefin. The value of (S+O)/N is determined by dividing the total of the part by weight of the hydrogenated styrene thermoplastic elastomer and the part by weight of the poly-olefin by the part by weight of the softener. The value of S+O+N is the total of the part by weight of the hydrogenated styrene thermoplastic elastomer, the part by weight of the poly-olefin, and the part by weight of the softener.

The EPDM rubber of ENB used in the experiments 20 and 24 was oil-extended EPDM rubber: Esprene E670F manufactured by Sumitomo Kagaku Kogyo Co., Ltd and contained the same amount of paraffin oil and the EPDM rubber polymer. 100 parts by weight of the EPDM rubber in the experiments 20 and 24 in the table 3 means that the rubber composition thereof contains 100 parts by weight of the EPDM rubber polymer and 100 parts by weight of the paraffin oil.

The oil-unextended EPDM rubber used in the experiments other than the experiments 20 and 24 was Esprene E505A manufactured by Sumitomo Kagaku Kogyo Co., Ltd.

In all the experiments, as the hydrogenated styrene thermoplastic elastomer (SEPS), Septon 4055 manufactured by Kuraray Co., Ltd was used. In all the experiments, polypropylene resin (manufactured by Nippon Polychem Co., Ltd.:

NovatekPP) was used as the poly-olefin except the experiment 23. In the experiment 23, EEA resin (DPDJ-9161 manufactured by Nippon Unika C o., Ltd.) was used as the poly-olefin. In all the experiments, Diana processoil Pw-380 (manufactured by Idemitsu Kousan Co., Ltd.) was used as the softener.

In the experiments 15–23, the hydrogenated styrene thermoplastic elastomer was swelled in the softener. Then, these substances and pellet of poly-olefin were kneaded by a biaxial extruder, a kneader or a Banbury mixer for 1–20 minutes at 160° C.–200° C. to prepare pellet consisting of the hydrogenated styrene thermoplastic elastomer, the poly-olefin, and a compound of the softener. Then, the pellet, the rubber, and additives were introduced into a biaxial extruder HTM38 (manufactured by Aipek Co., Ltd.). The additives were 12 parts by weight of reactive phenol resin (manufactured by Taoka Kagaku Kogyo Co., Ltd.: Tackirol 250-III) serving as resin vulcanizing agent, 5 parts by weight of zinc oxide (manufactured by Mitusi Kinzoku Kogyo Co., Ltd.: Chinese white No. 1), aging preventive agent, and filler and the like. Then, the mixture was kneaded for 1–20 minutes while it was being heated at 160° C.–200° C. to dynamically vulcanize the rubber. Then, the kneaded material was extruded from the biaxial extruder. Then, the kneaded rubber composition was formed into pellet. The pellet was molded by an injection molding machine to mold it into a tube shape. After the surface of the tube was polished, it was cut to form a rubber roller having an outer diameter of 20 mm, an inner diameter of 9 mm, and a width of 10mm. The cavity of a die of the injection molding machine had an outer diameter of 21 mm, an inner diameter of 9 mm, and a width of 40 mm.

In the experiment 24, the oil-extended EPDM rubber (containing paraffin oil), the hydrogenated styrene thermoplastic elastomer, the poly-olefin, and additives were introduced into the biaxial extruder HTM38 (manufactured by Aipek Co., Ltd.). The additives were 12 parts by weight of the reactive phenol resin (manufactured by Taoka Kagaku Kogyo Co., Ltd.: Tackirol 250-III) serving as the resin vulcanizing agent, 5 parts by weight of the zinc oxide (manufactured by Mitusi Kinzoku Kogyo co., Ltd.: Chinese white No. 1), the aging preventive agent, and the filler and the like. Then, the mixture was kneaded for 1–20 minutes while it was being heated at 160° C.–200° C. to dynamically vulcanize the rubber. Then, the kneaded material was extruded from the biaxial extruder. Then, the kneaded rubber composition was molded by an injection molding machine to mold it into a tube shape. Then, the surface of the tube was polished and cut to form a rubber roller having the same size as that of the rubber roller of the experiments 15–23.

In the experiment 25, the oil-unextended EPDM rubber, the hydrogenated styrene thermoplastic elastomer, the poly-olefin, the softener, and additives were introduced into the biaxial extruder HTM38 (manufactured by Aipek Co., Ltd.). The additives were 12 parts by weight of the reactive phenol resin (manufactured by Taoka Kagaku Kogyo Co., Ltd.: Tackirol 250-III) serving as the resin vulcanizing agent, 5 parts by weight of the zinc oxide (manufactured by Mitusi Kinzoku Kogyo Co., Ltd.: Chinese white No. 1), the aging preventive agent, and the filler and the like. Then, the mixture was kneaded for 1–20 minutes while it was being heated at 160° C.–200° C. to dynamically vulcanize the rubber. Then, the kneaded material was extruded from the biaxial extruder. Then, the kneaded rubber composition was molded by an injection molding machine to mold it into a tube shape. Then, the surface of the tube was polished and cut to form a rubber roller having the same size as that of the rubber roller of the experiments 15–24.

Figure 2:
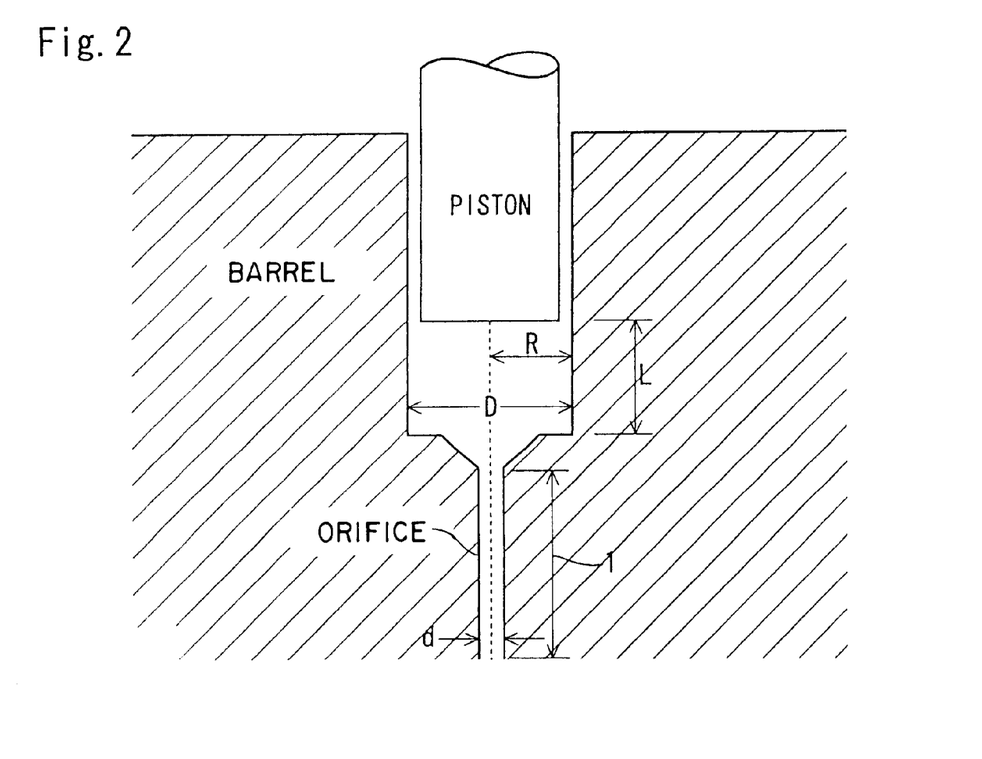
FIG. 2 is a schematic view showing a measuring device for measuring the melting viscosity of a rubber composition.

In the all experiments the melting viscosity (kPa·sec) of each kneaded rubber composition extruded from the biaxial extruder was measured at 200° C. as an apparent viscosity by means of a Monsant processability tester (MPT) shown in FIG. 2. The ratio (1/d) of the length (l) of the orifice of the tester MPT used for measurement to the inner diameter (d) thereof was 30. The shearing speed was set to $100\text{sec}^{-1}$.

As a result of examination of the moldability in the injection molding in all the experiments, preferable results were obtained. In particular, in the experiments 16, 17, 19, and 20 in which the melting viscosities of the kneaded rubber compositions were lower than 0.70, the rubber rollers had no breakage and crack (◎ in table 3). In other experiments except above-mentioned experiments, breakage and crack occurred at the end of each rubber roller. But each rubber roller could be put into practical use by cutting off the end thereof (○ in table 3).

The following characteristics of the rubber roller of each experiment prepared as described above were measured. That is, each tube-shaped rubber roller prepared thus was installed on a core material made of resin to use it as a paper supply roller. The paper supply roller was installed on a copying machine to measure the wear amount and friction coefficient thereof.

More specifically, each rubber roller was installed on the copying machine to conduct a paper-feeding test. In the test using the copying machine, 20,000 sheets of paper of size A4 (PPC paper manufactured by Fuji Xerox Office Supply Co., Ltd.) were continuously fed for 10 hours at 22° C. and at a humidity of 55%. The wear amount (mg) of each rubber roller was determined by measuring the weight of each rubber roller before and after 20,000 sheets of paper were fed. In the paper-feeding test, the friction coefficient of each rubber roller was measured by the method shown in FIG. 1. The friction coefficient was measured before and after 20,000 sheets of paper were fed.

Table 3 shows the result of the above measurement.

The friction coefficients shown in front of parenthesized ones in the table 3 are initial values measured before paper was fed. The friction coefficients parenthesized in the table 3 are values measured after 20,000 sheets of paper were fed.

The kind of the material and the containing ratio of the experiments 24 and 25 were the same as those of the experiment 16. In the experiment 16, the hydrogenated styrene thermoplastic elastomer, the poly-olefin, and the softener were kneaded to form a compound and then the compound and the rubber were kneaded. On the other hand, in the experiments 24 and 25, all the materials were heated while they were being kneaded all together to vulcanize the rubber dynamically. In this manner, a kneaded rubber composition is formed. The kneadability of the experiments 24 and 25 was inferior to that of the experiment 16. The melting viscosity of the kneaded material and the dispersibility of the vulcanized rubber of the the experiments 24 and 25 were also inferior to those of the experiment 16. Thus, the injection moldability of the kneaded rubber composition and the wear resistance of the rubber roller were inferior to those of the experiment 16. Accordingly, in order to imp rove the injection moldability of the kneaded rubber composition and the performance of the rubber roller, it is advantageous to knead the hydrogenated styrene thermoplastic elastomer, the poly-olefin, and the softener to form a compound and then knead the compound and the rubber.

As apparent from the foregoing description, the present invention provides a rubber composition preferable in permanent compression set, heat resistance, friction coefficient, wear resistance, and material cost. When the rubber composition is used for paper-feeding rubber rollers of paper-feeding mechanisms of image-forming apparatuses such as an electrostatic copying apparatus and automatic deposit payment machines (ATM) by molding it into a roller, the rubber roller can feed paper reliably for a long time and can be manufactured at a low cost.

Further, the addition of softener improves productivity. That is, the softener improves the kneadability, thus reducing the melting viscosity of a melted kneaded material. Thus, it is possible for an injection molding machine to mold the kneaded material into a rubber roller having preferable paper-feeding performance without defective molding.

What is claimed is:

1. A rubber composition containing 20 parts by weight–200 parts by weight of hydrogenated styrene thermoplastic elastomer and poly-olefin for 100 parts by weight of rubber, wherein said rubber is dynamically vulcanized with a resin vulcanizing agent to disperse in a mixture of said hydrogenated styrene thermoplastic elastomer and said poly-olefin, and wherein the friction coefficient of the hydrogenated styrene thermoplastic elastomer is 1.6–1.9.

2. The rubber composition according to claim 1, wherein the rubber contains 50 weight % or more of EPDM rubber.

3. The rubber composition according to claim 1, wherein the weight ratio between said hydrogenated styrene thermoplastic elastomer and said poly-olefin is 9:1–3:7.

4. The rubber composition according to claim 1, wherein alkyl phenol formaldehyde resin is used as said resin vulcanizing agent.

5. The rubber composition according to claim 1, wherein the rubber composition is molded into a roller-shape for using a paper-feeding rubber roller.

6. The rubber composition according to claim 5, wherein a surface of said paper-feeding rubber roller is polished to cut a hydrogenated styrene thermoplastic elastomer present thereon so as to form irregularities increasing a friction coefficient.

7. A rubber composition containing 20 parts by weight–300 parts by weight of hydrogenated styrene thermoplastic elastomer, poly-olefin, and softener for 100 parts by weight of rubber, wherein said softener is 10 parts by weight–200 parts by weight for 100 parts by weight of said rubber, and said rubber is dynamically vulcanized with a resin vulcanizing agent to disperse in a mixture of said hydrogenated styrene thermoplastic elastomer, said poly-olefin and said softener, and wherein the friction coefficient of the hydrogenated styrene thermoplastic elastomer is 1.6–1.9.

8. The rubber composition according to claim 7, wherein the rubber contains 50 weight % or more of EPDM rubber.

9. The rubber composition according to claim 7, wherein the total of the part by weight of said hydrogenated styrene thermoplastic elastomer and said poly-olefin is set to 0.3–5.0 for one part by weight of said softener.

10. The rubber composition according to claim 7, wherein the weight ratio between said hydrogenated styrene thermoplastic elastomer and said poly-olefin is 9:1–3:7.

11. The rubber composition according to claim 7, wherein alkyl phenol formaldehyde resin is used as said resin vulcanizing agent.

12. The rubber composition according to claim 7, wherein said rubber composition is molded into a roller-shape for using a paper-feeding rubber roller.

13. The rubber composition according to claim 12, wherein a surface of said paper-feeding rubber roller is polished to cut a hydrogenated styrene thermoplastic elastomer present thereon so as to form irregularities increasing a friction coefficient.

14. A method of manufacturing a rubber composition containing 20 parts by weight–300 parts by weight of hydrogenated styrene thermoplastic elastomer, poly-olefin, and softener for 100 parts by weight of rubber, wherein the softener is 10 parts by weight–200 parts by weight for 100 parts by weight of said rubber, said method comprising the steps of:

preparing a kneaded material of said hydrogenated styrene thermoplastic elastomer, said poly-olefin, and said softener;

kneading and heating said kneaded material, said rubber, and resin vulcanizing agent so that said rubber is dynamically vulcanized to disperse fine particles of said vulcanized rubber in said kneaded material of said hydrogenated styrene thermoplastic elastomer, said poly-olefin, and said softener.

15. The method of manufacturing the rubber composition according to claim 14, wherein the rubber contains 50 weight % or more of EPDM rubber.

* * * * *